3,243,395
POLYETHYLENE MODIFIED WITH POLYPROPYLENE WAX
James E. Guillet and Harry W. Coover, Jr., Kingsport, Tenn., assignors to Eastman Kodak Company, Rochester, N.Y., a corporation of New Jersey
No Drawing. Filed Dec. 28, 1960, Ser. No. 78,862
13 Claims. (Cl. 260—28.5)

This invention relates to polymeric compositions exhibiting improved physical properties. More particularly, this invention relates to compositions of normally solid polyethylene and polypropylene wax. In a specific aspect, this invention concerns polymeric compositions comprising normally solid polyethylene and polypropylene wax, which compositions exhibit improved flow and stiffness properties.

Polyethylene has been described rather extensively in the literature and has been produced commercially in a variety of types having distinct physical properties. These different types of polyethylene have been separately classified and distinguished primarily by the density of the polymer. The first type of polyethylene that was produced commercially was the so-called low-density type, i.e. polyethylene having a density within the range of about 0.90 to about 0.935. This type of polyethylene has been produced for some years in accordance with the process described by Fawcett et al. in U.S. Patent No. 2,153,553. Higher density types of polyethylene have also been made and are described in the literature. For example, it is known that a medium density polyethylene having a density within the range of about 0.935 to about 0.945 can be produced. In addition, processes have been developed for the preparation of a high density type of polyethylene, i.e. polyethylene having a density within the range of about 0.945 to about 0.975 and higher.

The well known, normally solid types of polyethylene which have been described in the literature have found many uses in the domestic and industrial fields due to their distinctive physical properties. However, in many cases specifically improved properties or properties covering a wider range are needed and the aforementioned types of polyethylene are somewhat deficient in one or more of the needed properties. For example, polyethylene is particularly useful in the film and packaging field and for such uses the low density type of polyethylene, as contrasted with the medium or high density types, has been found to be the most desirable due to its toughness and flexibility. However, low density polyethylene, when in the form of a film, does not possess the stiffness for processing on automatic packaging machinery or the transparency and clarity desired for some uses in the film and packaging field.

Many suggestions have been made for improving specific properties or the level of properties exhibited by a particular type of polyethylene, but none of these suggestions have been completely satisfactory. Attempts have been made to improve the properties of polyethylene by the addition of one or more of a great many materials such as, for example, waxes. However, while some specific properties are improved in such compositions, it is usually at the expense of some other property or properties.

It is accordingly an object of this invention to provide new and improved polyethylene compositions exhibiting improved physical properties when compared with polyethylene itself.

Another object of this invention is to provide new and improved polyethylene compositions having specific properties of polyethylene improved without materially downgrading the other physical properties of the polyethylene employed in the composition.

Still another object of this invention is to provide low density polyethylene which, in the form of film, exhibits increased stiffness making it extremely useful in processing on automatic packaging machinery.

A further object of this invention is to provide polyethylene compositions exhibiting improved flow characteristics, stiffness, heat distortion temperatures, hardness and tensile strength when compared with conventional polyethylene.

Still another object of this invention is to provide polyethylene compositions which, when in the form of film, will exhibit excellent blocking characteristics, tear strength, clarity and transparency and a low coefficient of friction.

Further objects and advantages of the invention will be apparent to those skilled in the art from an examination of the specification and claims.

In accordance with this invention, it has been found that normally solid polyethylene is compatible with a particular class of polypropylene waxes, as herein described, and that this compatibility can be utilized to modify polyethylene to give novel compositions exhibiting improved physical properties. Hence, novel compositions comprising normally solid polyethylene and about 1 to about 30% or more preferably about 5 to about 15% by weight, based on the composition, of one or more substantially crystalline polypropylene waxes, as hereinafter described, have been found to exhibit improved physical properties in comparison to the polyethylene employed in the composition.

The discovery that compositions comprising normally solid polyethylene and a particular class of hydrocarbon waxes, i.e. substantially crystalline polypropylene waxes, as hereinafter described, exhibit improved physical properties is quite surprising since it could not have been predicted from the prior art. For example, British Patent 762,592 discloses that a blend of normally solid polyethylene and a hydrocarbon, specifically polyethylene, having a molecular weight in the wax range has substantially the same physical properties as the unmodified normally solid polyethylene. In contrast, the polyethylene-hydrocarbon wax blends which form the novel compositions of this invention exhibit properties which are significantly superior to those exhibited by the normally solid polyethylene itself.

It is well known in the art that physical properties of polyethylene-wax blends, e.g. stiffness and hardness, improve with an increase in the density of the total blend. However, a significant feature of this invention is that the stiffness and hardness properties exhibited by our novel polyethylene-wax blends improve as the densities of the blends decrease. Thus, the compositions disclosed herein are quite different from those of the prior art and, as a result of this difference, a higher level of properties per unit volume of material is obtained than was possible with any of the polyethylene-wax compositions known to the art prior to this invention. This higher level of properties per unit volume of material makes it possible to form lighter and stronger plastic articles from our novel compositions than could be obtained from prior art products.

Still another significant feature of this invention is that the compositions of this invention generally have the excellent flow properties associated with a wax and yet when they are cooled to a solid state they assume superior plastic properties. As a result of this particular combination of properties, these compositions are extremely useful in slush molding operations to give objects with greatly improved hardness and surface finish. Thus, by blending polyethylene having a density of 0.914 and a melt index of 20 with 30% by weight, based on the blend, of substantially crystalline polypropylene wax having a density of 0.916 and an inherent viscosity in tetralin at 140° C. of 0.09 it is possible to obtain a composition which can be used in slush molding operations with good results.

Any of the well known normally solid polyethylene resins can be employed in the practice of this invention. These resins can be prepared by any one of the conventional processes now available to the art as exemplified by the process disclosed in the aforementioned Fawcett et al. patent or any of the other well known polymerization processes as exemplified by U.S. Patents 2,816,886, 2,824,090, 2,832,759, 2,833,755 and 2,921,059. In general, the normally solid polyethylene resins used in the preparation of the novel compositions of this invention are characterized by having a density in the range of about 0.90 to about 0.975 or higher, a molecular weight in the range of about 10,000 to about 200,000 and more preferably 20,000 to about 50,000, a melting point within the range of about 90° C. to about 135° C. and a melt index (ASTM D1238-52T) within the range of about 0.1 to about 200 and preferably within the range of about 0.3 to about 20. The concentration of polyethylene used in the plastic compositions of this invention is ordinarily in the range of about 70 to about 99% by weight, and more preferably 85 to 95% by weight, based on the composition.

In general, it has been found that a substantially crystalline polypropylene wax having an average molecular weight in the range of about 1,000 to 8,000, a density of at least 0.90, and preferably within the range of about 0.90 to 0.93, an ASTM D36-26 ball and ring softening point of at least 130° C. and preferably in the range of about 135 to about 170° C., an ASTM D5-52 penetration hardness value of 0 at 100 g. load for 5 seconds and below 2 at 250 g. load for 5 seconds, and an acid number of substantially 0 will impart the desired improvement in properties to normally solid polyethylene. The molecular weight of such a polypropylene wax can best be determined by measuring its inherent viscosity in tetralin at 140° C., which, for purposes of this invention should be in the range of about 0.05 to about 0.50.

The polypropylene waxes employed in this invention and a process for their preparation are described in U.S. Patent 2,835,659 to James E. Guillet. As pointed out in U.S. Patent 2,835,659, one method for preparing the substantially crystalline polypropylene waxes employed herein is to heat in the substantial absence of oxygen, at temperatures of 300 to 450° C., crystalline polypropylene having a density of at least 0.90 and an average molecular weight of at least 20,000 until the molecular weight is reduced to a value within the range of 1,000 to 8,000.

In practicing the invention it is preferred to employ about 1 to 30% and more preferably 5 to 15% by weight, based on the composition, of the polypropylene wax. In general, concentrations of at least 5% by weight of polypropylene wax are preferred even though as little as 1% by weight of this wax can be employed to improve the properties of normally solid polyethylene. The polyethylene-polypropylene wax blends of this invention can, of course, contain minor quantities of other ingredients, including for example, stabilizing agents, compatible resins, plasticizing agents or other compounding materials known to be useful in such blends. As is obvious to those skilled in the art, such other ingredients should not be present in quantities such as will prevent the desired improvement in physical properties from being imparted to the normally solid polyethylene. Although more than 30% by weight of the polypropylene wax can be blended with polyethylene, it has been found that the resulting composition has an average molecular weight which is too low for good physical properties.

Blends of normally solid polyethylene with one or more of the polypropylene waxes described herein can be prepared in any desired manner, whether it be by rolling, extrusion, melt mixing or solution mixing. Thus, they can be prepared at elevated temperatures on rolls, in a Banbury mixer or any other suitable type of processing equipment.

This invention can be further illustrated by the following examples of preferred embodiments thereof although it will be understood that these examples are included merely for purposes of illustration and are not intended to limit the scope of the invention unless otherwise specifically indicated:

The film coefficient of friction listed in the following examples were measured on a strip of film approximately 3 feet long. Another sample of the film was carefully fastened around a flat-bottom block (referred to as "boat") making sure that there were no wrinkles or creases on the face of the film. The long strip of film was then started through a wringer which was used to pull the film. The wringer motor was cut off and the boat was placed flat side down on the piece of film and connected to a load measuring device. The wringer motor was then turned on, and as the film was pulled underneath the boat at 10 ft. per minute, the load measuring device indicated the resistance which the boat was offering to the film being pulled beneath it. This value was recorded. This procedure was repeated five times with each sample of film and an average value taken. The coefficient of friction was calculated by dividing the weight of the boat (466 grams) into the average load observed during the test.

The blocking value of the films tested in the examples was determined by ASTM D884-48 with the condition being 50° C. and 1 p.s.i. pressure. The value under "as extruded" was the blocking index of the film as received from the extruder. The blocking index was modified from the ASTM test as follows:

| Blocking index: | Description |
| --- | --- |
| 0 | Does not block at any point. |
| 1 | Very, very slight blocking. Will fall apart under own weight with no shaking. Blocks less than 25% of total surface. |
| 2 | Same as No. 1 but blocks greater than 25% of total surface. |
| 3 | Very slight blocking. Will fall apart with very slight shaking. Easily slid apart with fingers. |
| 4 | Slight blocking. Will fall apart with slight shaking, easily slid apart with fingers. |
| 5 | Blocking. Must be pulled apart or shaken hard. Can be slid apart with fingers with some difficulty. |
| 6 | Badly blocked. Must be pulled apart. Cannot be slid apart with fingers. When sheets are held in each hand and pulled apart the polyethylene sheets makes greater than a 30° angle with the horizontal. |
| 7 | Very badly blocked. Same as No. 6 except the angle is less than 30° with horizontal when the two sheets are pulled apart with the blocked section hanging vertically. |

EXAMPLE 1

Three blends are prepared by milling polyethylene having a density of 0.92 and a melt index of 1.03 with 5, 10 and 15% by weight, based on the blend, of polypropylene wax having a density of 0.912 and an inherent viscosity in tetralin at 140° C. of 0.52 on hot rolls. After rolling, the blends are granulated and extruded into a 1 mil thick film at a temperature of about 300° F. In each case physical properties determined on the film or compression molded plates establish that the blend possesses an unexpectedly superior level of physical properties when compared with the physical properties exhibited by the same polyethylene which is not blended with polypropylene wax. A comparison of the physical properties exhibited by the aforementioned blends and those exhibited by the unmodified plastic-grade polyethylene is set forth in the following table.

*Table I*

| Percent wax | 0 | 5 | 10 | 15 |
|---|---|---|---|---|
| Density (Density gradient tube) | 0.918 | 0.917 | 0.916 | 0.914 |
| Durometer hardness (Shore durometer) | D49 | D49 | D52 | D53 |
| Heat distortion temperature, ° C. | 96 | 101 | 103 | 105 |
| Melt index (ASTM D1238-52T) | 1.03 | 3.5 | 5.2 | 13.1 |
| Tensile strength at yield (p.s.i.) (ASTM D412-51T) | 1,550 | 1,450 | 1,450 | 1,450 |
| Stiffness (p.s.i.) (ASTM D747-50) | 16,000 | 18,000 | 20,000 | 31,000 |
| Button impact strength | 18.0 | 24.6 | 17.9 | 12.1 |
| Film blocking, as extruded | 7 | 7 | 3 | 2 |
| ASTM D884-48 (1 p.s.i.) | 7 | 7 | 3 | 0.5 |
| Film shock brittleness | None | None | None | Slight |
| Film coefficient of friction | >.90 | .85 | 0.74 | 0.59 |

The superior level of physical properties exhibited by the novel compositions of this invention becomes obvious from an inspection of the above table. In each instance, one or more of the physical properties exhibited by normally solid polyethylene are greatly improved by blending with polypropylene wax without materially downgrading the other physical properties of such polyethylene. Furthermore, particular note should be taken of the fact that stiffness and hardness values increase as the concentartion of wax increases regardless of the fact that the density of the blend decreases. As indicated above, it is known that most of the properties of prior art polyethylene-wax blends improve with increasing density. Hence, the increase in stiffness and hardness which is exhibited by the novel compositions of this invention is totally unexpected.

EXAMPLE 2

As already indicated, the novel compositions of this invention containing low density polyethylene and polypropylene wax exhibit physical properties which make them extremely valuable in the film and packaging fields. To illustrate, three blends are prepared by milling, on hot rolls, low density polyethylene having a density of 0.920 and a melt index of 1.0 with 4, 9 and 14%, by weight, based on the blend, of polypropylene wax having a density of 0.914 and an inherent viscosity in tetralin at 140° C. of 0.09. After granulation, the polymer compositions are extruded into tubular film using a die temperature of 350° C. The physical properties exhibited by the resulting films and those exhibited by the same low density polyethylene film prepared in the same manner are compared in the following table.

*Table II*

| Percent wax | 0 | 4.0 | 9.0 | 14.0 |
|---|---|---|---|---|
| Blocking (as extruded) | 7 | 7 | 6 | 5 |
| Coefficient of friction | >0.9 | >0.9 | >0.9 | >0.9 |
| Elmendorf tear strength: | | | | |
| Machine direction | 119 | 230 | 277 | 86 |
| Transverse direction | 284 | 294 | 322 | 272 |

As can be seen from an examination of the above table, the tear strength of low density polyethylene, which property is extremely important in the fields of film and packaging, is significantly improved by blending with polypropylene wax according to this invention. Furthermore, the film formed from the blended compositions of this invention is high in both directions, while that of the unmodified polyethylene is low in the machine direction.

EXAMPLE 3

As indicated above, the stiffness of polyethylene can be increased by blending with polypropylene wax according to this invention. Thus, polyethylene having a density of 0.928 and a melt index of 0.3 is blended with 15% by weight, based on the blend, of substantially crystalline polypropylene wax having a density of 0.905 and an inherent viscosity in tetralin at 140° C. of 0.21. The unmodified polyethylene, in the form of a molded plate, exhibits a stiffness of only 28,000 p.s.i. In contrast, a molded plate formed from the blend exhibits a stiffness of 35,000 p.s.i.

EXAMPLE 4

Polyethylene having a density of 0.961 and a melt index of 0.25 is blended with 10% by weight, based on the blend, of polypropylene wax having an inherent viscosity of 0.08 in tetralin at 140° C., a melt viscosity of 26 cp. at 190° C. and a melting point of about 145° C. The blend is prepared by milling on hot rolls. The resulting blend is injection molded into tensile specimens and the phyiscal properties determined. A comparison of the properties of the blend with that of the unmodified polyethylene is shown in the following table:

*Table III*

| Percent wax | 0 | 10 |
|---|---|---|
| Melt index (ASTM D1238-52T) | 0.26 | 0.35 |
| Density (Gradient tube) | 0.961 | 0.955 |
| Tensile strength (p.s.i.) (ASTM D412-51T) | 5620 | 6180 |
| Elongation, percent (ASTM D412-51T) | 50 | 60 |
| Stiffness (p.s.i.) (ASTM D747-50) | 73,000 | 76,000 |
| Durometer hardness | D69 | D70 |
| Button impact strength | 25.1 | 23.3 |

As seen from the above table, several valuable physical properties of polyethylene are improved by blending with polypropylene wax according to this invention. Hence, improvements are shown in flow, hardness, stiffness and tensile strength.

EXAMPLE 5

Polyethylene having a melt index of 0.32 and a density of 0.956 is blended on hot rolls with 20% by weight, based on the blend, of polypropylene wax having an inherent viscosity in tetralin at 140° C. of 0.45 and a density of 0.906. The resulting blend has a melt index of 1.2 and a density of 0.947. The tensile strength of injection molded specimens of the blend is 5200 p.s.i. compared to 4550 p.s.i. for the unmodified polyethylene.

Thus, by the practice of this invention, there is provided novel polyethylene-polypropylene wax compositions exhibiting a superior level of physical properties including, for example, melt flow, stiffness, hardness, tensile strength, heat distortion temperature, film blocking, film shock brittleness and film coefficient of friction. These compositions can be employed as substitutes for polyethylene wherever these superior properties are of significance. For example, our novel compositions containing low density polyethylene are primarily sought for use in making highly transparent glossy film. This film can be used in packaging new clothes and in making garment bags for use in the dry cleaning industry.

Although the invention has been described in consider-

We claim:
1. A polymeric composition exhibiting improved physical properties comprising normally solid polyethylene, having a density of at least .90 and a molecular weight of at least 10,000 and about 1 to about 30% by weight, based on the composition, of substantially crystalline polypropylene wax having an average molecular weight in the range of about 1,000 to about 8,000, a density of at least .90, an ASTM D36–26 ball and ring softening point of at least 130° C., an ASTM D5–52 penetration hardness value of 0 at 100 g. load for 5 seconds and below 2 for 250 g. load for 5 seconds, and an acid number of 0.

2. A polymeric composition exhibiting improved physical properties comprising normally solid polyethylene, having a density of at least .90 and a molecular weight of at least 10,000 and about 5 to about 15% by weight, based on the composition, of substantially crystalline polypropylene wax having an average molecular weight in the range of about 1,000 to about 8,000, a density of at least .90 an ASTM D36–26 ball and ring softening point of at least 130° C., an ASTM D5–52 penetration hardness value of 0 at 100 g. load for 5 seconds and below 2 for 250 g. load for 5 seconds, and an acid number of 0.

3. A polymeric composition exhibiting improved physical properties comprising normally solid polyethylene, having a density of at least .90 and a molecular weight of at least 10,000 and about 1 to about 30% by weight, based on the composition, of substantially crystalline polypropylene wax having an average molecular weight in the range of about 1,000 to about 8,000, a density in the range of about .90 to about .93, an ASTM D36–26 ball and ring softening point in the range of about 135° to about 170° C., an ASTM D5–52 penetration hardness value of 0 at 100 g. load for 5 seconds and below 2 for 250 g. load for 5 seconds, and an acid number of 0.

4. A polymeric composition exhibiting improved physical properties comprising normally solid polyethylene, having a density in the range of about .90 to about .975 and a melt index in the range of about .1 to about 200 and about 1 to about 30% by weight, based on the composition, of substantially crystalline polypropylene wax having an average molecular weight in the range of about 1,000 to about 8,000, a density of at least .90, an ASTM D36–26 ball and ring softening point of at least 130° C., an ASTM D5–52 penetration hardness value of 0 at 100 g. load for 5 seconds, and an acid number of 0.

5. A polymeric composition exhibiting improved physical properties comprising normally solid polyethylene, having a density in the range of about .90 to .975, a melt index in the range of about .1 to about 200 and about 1 to about 30% by weight, based on the composition, of substantially crystalline polypropylene wax having an average molecular weight in the range of about 1,000 to about 8,000, a density within the range of about .90 to .93, an ASTM D36–26 ball and ring softening point in the range of about 135° to about 170° C., an ASTM D5–52 penetration hardness value of 0 at 100 g. load for 5 seconds and below 2 for 250 g. load for 5 seconds, and an acid number of 0.

6. A polymeric composition exhibiting improved physical properties comprising normally solid polyethylene having a density in the range of about .90 to about .935, and a melt index in the range of about .1 to about 200 and about 1 to about 30% by weight, based on the composition, of substantially crystalline polypropylene wax having an average molecular weight in the range of about 1,000 to about 8,000 and a density in the range of .90 to .93, an ASTM D36–26 ball and ring softening point in the range of about 135° to about 170° C., an ASTM D5–52 penetration hardness value of 0 at 100 g. load for 5 seconds and below 2 for 250 g. load for 5 seconds, and an acid number of 0.

7. A polymeric composition exhibiting improved physical properties comprising normally solid polyethylene having a density of .92 and a melt index of 1.03, and 15% by weight, based on the composition, of substantially crystalline polypropylene wax having an inherent viscosity in tetralin at 140° C. of .52, a density of .912, an ASTM D36–26 ball and ring softening point of at least 130° C., an ASTM D5–52 penetration hardness value of 0 at 100 g. load for 5 seconds and below 2 for 250 g. load for 5 seconds, and an acid number of 0.

8. A polymeric composition exhibiting improved physical properties comprising normally solid polyethylene having a density of .92 and a melt index of 1.03, and 10% by weight, based on the composition, of substantially crystalline polypropylene wax having an inherent viscosity in tetralin at 140° C. of .52, a density of .912, an ASTM D36–26 ball and ring softening point of at least 130° C., an ASTM D5–52 peneration hardness value of 0 at 100 g. load for 5 seconds and below 2 for 250 g. load for 5 seconds, and an acid number of 0.

9. A polymeric composition exhibiting improved physical properties comprising normally solid polyethylene having a density of .92 and a melt index of 1, and 14% by weight, based on the composition, of substantially crystalline polypropylene wax having an inherent viscosity in tetralin at 140° C. of .09, a density of .914, an ASTM D36–26 ball and ring softening point of at least 130° C., an ASTM D5–52 penetration hardness value of 0 at 100 g. load for 5 seconds and below 2 for 250 g. load for 5 seconds, and an acid number of 0.

10. A polymeric composition exhibiting improved physical properties comprising normally solid polyethylene having a density of .928 and a melt index of .3 and 15% by weight, based on the composition, of substantially crystalline polypropylene wax having an inherent viscosity in tetralin at 140° C. of .21, a density of .905, an ASTM D36–26 ball and ring softening point of at least 130° C., an ASTM D5–52 penetration hardness value of 0 at 100 g. load for 5 seconds and below 2 for 250 g. load for 5 seconds, and an acid number of 0.

11. A polymeric composition exhibiting improved physical properties comprising normally solid polyethylene having a density of .956, a melt index of .32, and 20% by weight, based on the composition, of substantially crystalline polypropylene wax having an inherent viscosity of .45, a density of .906, an ASTM D36–26 ball and ring softening point of at least .90, an ASTM D5–52 penetration hardness value of 0 at 100 g. load for 5 seconds and below 2 for 250 g. load for 5 seconds, and an acid number of 0.

12. Thin, unsupported film formed from a composition comprising normally solid polyethylene having a density of at least .90 and a molecular weight of at least 10,000 and about 1 to about 30% by weight, based on the composition, of substantially crystalline polypropylene wax having an average molecular weight in the range of about 1,000 to about 8,000, a density of at least .90, an ASTM D36–26 ball and ring softening point of at least 130° C., an ASTM D5–52 penetration hardness value of 0 to 100 g. load for 5 seconds and below 2 for 250 g. load for 5 seconds, and an acid number of 0.

13. Thin, unsupported film formed from a composition comprising normally solid polyethylene having a density within the range of about .90 to about .935, a melt index in the range of about .1 to about 200, and about 1 to about 30% by weight, based on the composition, of substantially crystalline polypropylene wax having an average molecular weight in the range of about 1,000 to about 8,000, a density within the range of about .90 to .93, an ASTM D36–26 ball and ring softening point in the range of about 135° to about 170° C., an ASTM D5–52 penetration hardness value of 0 at 100 g. load for 5 seconds and below 2 for 250 g. load for 5 seconds, and an acid number of 0.

References Cited by the Examiner

UNITED STATES PATENTS

| | | | |
|---|---|---|---|
| 2,261,760 | 11/1941 | Habgood | 260—45.5 |
| 2,290,794 | 7/1943 | Alvarado et al. | 260—28.5 |
| 2,369,471 | 2/1945 | Latham | 260—45.5 |
| 2,628,214 | 2/1953 | Punkney et al. | 260—45.5 |
| 2,824,089 | 2/1958 | Peters et al. | 260—45.5 |
| 2,835,659 | 5/1958 | Guillet | 260—93.7 |
| 2,924,584 | 2/1960 | Wolinski | 260—45.5 |
| 2,956,042 | 10/1960 | Underwood et al. | 260—897 |
| 2,976,272 | 3/1961 | Coover et al. | 260—93.7 |
| 2,996,494 | 8/1961 | Cash | 260—93.7 |

FOREIGN PATENTS 602,151   7/1960   Canada.

OTHER REFERENCES

Bennett: "Commercial Waxes," Second Edition, Chemical Publishing Co., New York, N.Y., page 33, 1956.

Raff et al.: "Polyethylene," Interscience Publishers, Inc., New York, page 156.

MORRIS LIEBMAN, *Primary Examiner.*

ALPHONSO D. SULLIVAN, ALEXANDER H. BRODMERKEL, *Examiners.*

H. W. HAEUSSLER, J. ZIEGLER, B. A. AMERNICK,
*Assistant Examiners.*